(12) United States Patent
Kim et al.

(10) Patent No.: US 9,669,384 B2
(45) Date of Patent: Jun. 6, 2017

(54) WATER-ABSORBING RESIN AND PREPARING METHOD THEREOF

(71) Applicants: SK GLOBAL CHEMICAL CO., LTD., Seoul (KR); SK INNOVATION CO., LTD, Seoul (KR)

(72) Inventors: Ju-Hee Kim, Daejeon (KR); Du-Youn Ka, Daejeon (KR); Byoung-Tak Yim, Daejeon (KR); Byoung-Cheon Jo, Seoul (KR)

(73) Assignees: SK GLOBAL CHEMICAL CO., LTD., Seoul (KR); SK INNOVATION CO., LTD., Seoul (KR)

( * ) Notice: Subject to any disclaimer, the term of this patent is extended or adjusted under 35 U.S.C. 154(b) by 0 days.

(21) Appl. No.: 15/011,732

(22) Filed: Feb. 1, 2016

(65) Prior Publication Data

US 2016/0220980 A1    Aug. 4, 2016

(30) Foreign Application Priority Data

Jan. 30, 2015    (KR) .................. 10-2015-0015467

(51) Int. Cl.
| | | |
|---|---|---|
| *C08F 2/00* | (2006.01) | |
| *C08F 24/00* | (2006.01) | |
| *C08F 118/02* | (2006.01) | |
| *C08F 20/06* | (2006.01) | |
| *B01J 20/26* | (2006.01) | |
| *B01J 20/30* | (2006.01) | |
| *C08F 220/06* | (2006.01) | |

(52) U.S. Cl.
CPC ......... *B01J 20/261* (2013.01); *B01J 20/3085* (2013.01); *C08F 220/06* (2013.01)

(58) Field of Classification Search
CPC .... B01J 20/261; B01J 20/3085; C08F 220/06; A61L 15/60
USPC .......................... 526/317.17, 319, 266, 204
See application file for complete search history.

(56) References Cited

U.S. PATENT DOCUMENTS 7,238,743 B2 *  7/2007  Matsumoto .............  C08F 20/06
                                                        524/556
9,518,133 B2    12/2016  Fujino et al.

FOREIGN PATENT DOCUMENTS

| JP | 5183918 B2 | 4/2013 |
|---|---|---|
| KR | 1999-0077746 A | 10/1999 |
| KR | 10-1340254 B1 | 12/2013 |

(Continued)

OTHER PUBLICATIONS

Office action issued on May 22, 2015 from Korean Intellectual Property Office in a counterpart Korean Patent Application No. 10-2015-0015467.

(Continued)

*Primary Examiner* — William Cheung
(74) *Attorney, Agent, or Firm* — The PL Law Group, PLLC

(57) ABSTRACT

Disclosed are a water-absorbing resin and a method of preparing the same, wherein absorbency under unload of the water-absorbing resin is 25 g/g or more, the absorbency under load is 20 g/g or more, and an increase in extractables at a high temperature represented by Equation 1 ranges from 1 or more but less than 3, thereby it is possible to solve a problem that gel-blocking of the water-absorbing resin is accelerated at a high temperature, and improve absorption rate and dry efficiency of the water-absorbing resin.

12 Claims, 1 Drawing Sheet

(56) References Cited

FOREIGN PATENT DOCUMENTS

WO    2010-090324 A1    8/2010

OTHER PUBLICATIONS

Leibfarth, Frank A. et al. "Ketene Functionalized Polyethylene: Control of Cross-Link Density and Material Properties", J. Am. Chem. Soc. 2010, vol. 132, pp. 14706-14709, May 10, 2010.
Office action issued on Jul. 30, 2015 from Korean Intellectual Property Office in a counterpart Korean Patent Application No. 10-2015-0015467.
Notice of Allowance issued on Feb. 15, 2016 from Korean Intellectual Property Office in a counterpart Korean Patent Application No. 10-2015-0015467.

* cited by examiner

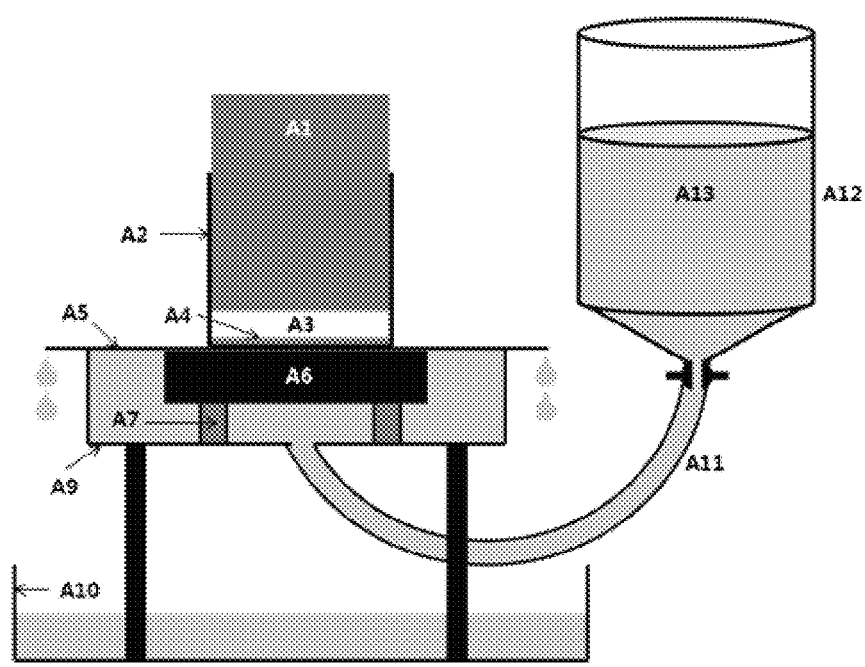

WATER-ABSORBING RESIN AND PREPARING METHOD THEREOF

CROSS-REFERENCE TO RELATED APPLICATION

This application claims priority to and the benefit of Korean Patent Application No. 10-2015-0015467, filed on Jan. 30, 2015, the disclosure of which is incorporated herein by reference in its entirety.

BACKGROUND

1. Field of the Invention

The present invention relates to a water-absorbing resin and a method of preparing the same.

2. Description of the Related Art

A super-absorbent polymer ('SAP') is a resin capable of absorbing water of several tens to thousands of times the weight of the resin, and refers to a polymer material having a hydrophilic three dimensional net-mesh structure that does not release absorbed water even when a pressure applied thereto in some degree. In early days, there were many super-absorbent polymers using natural polymer such as starch, but in recent years, a synthetic polymer prepared by polymerizing acrylic acid or acrylamide with a small amount of cross-linking agent is mostly used. Currently, a novel absorbent resin capable of absorbing water of several tens to several hundreds of times the weight of the resin has been developed and broadly used in various applications requiring water absorption or water retention including hygienic products such as diapers, sanitary goods, etc.

In a polymerization process among processes of preparing the super-absorbent polymer, a number of oligomers having insufficiently increased molecular weight (waster-soluble fraction, 'extractables') may be generated in the resin. If a large quantity of the extractables exist in the resin, these may be dissolved in water or the like, when the resin is actually applied to products, hence causing a problem of being easily dissolved in water or body fluid and eluted out of the products. Accordingly, there is a need for reduction of extractables.

During polymerization of a base resin for a water-absorbing resin, the cross-linking agent has higher reactivity than that of the acrylic acid. Therefore, the cross-linking agent is completely exhausted at an early stage of the reaction, while a polymerization of acrylic monomers may occur at a later stage of the reaction to generate the extractables. Accordingly, it is required to solve a problem that the cross-linking reaction is completed at the early stage thereof.

In addition, there is still a need for improving absorption rate and dry efficiency of the water-absorbing resin. Among solutions for improvement thereof, a foaming technique during the polymerization is known in the related art. This method generally includes addition of a foaming agent or use of an additive for controlling a foaming time and/or a particle diameter of foams. However, this method also entails problems of an increase in production costs and requiring a complicated process.

SUMMARY

Accordingly, an object of the present invention is to provide a water-absorbing resin capable of improving absorption rate and dry efficiency.

In addition, another object of the present invention is to provide a water-absorbing resin capable of solving such a problem that gel-blocking of the water-absorbing resin is accelerated at a high temperature.

Further, another object of the present invention is to provide a method of preparing the water-absorbing resin.

The above objects of the present invention will be achieved by the following characteristics:

(1) A method of preparing a water-absorbing resin, comprising: polymerizing a composition which includes an acrylic monomer, a polymerization initiator and an internal cross-linking agent represented by Formula 1 below:

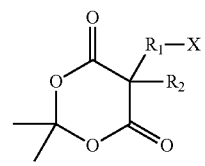

[Formula 1]

(wherein $R_1$ is an alkylene group having 1 to 20 carbon atoms, an arylene group having 6 to 12 carbon atoms or a combination of alkylene group and arylene group having a total 7 to 20 carbon atoms, $R_2$ is hydrogen, an alkyl group having 1 to 20 carbon atoms, an aryl group having 6 to 12 carbon atoms, or an alkyl group having 1 to 20 alkyl groups substituted with an aryl group having 6 to 12 carbon atoms, and X is a vinyl group).

(2) The method according to the above (1), wherein the internal cross-linking agent is 5-benzyl-2,2-dimethyl-5-(4-vinylbenzyl)-[1,3]dioxane-4,6-dione.

(3) The method according to the above (1), wherein the internal cross-linking agent is included in an amount of 0.001 to 2 parts by weight to 100 parts by weight of the monomer.

(4) A water-absorbing resin, having an absorbency under unload of 25 g/g or more, an absorbency under load of 20 g/g or more, and an increase in extractables at a high temperature in a range of 1 or more but less than 3, which is represented by Equation 1 below.

Increase in extractables at a high temperature=(Content of extractables at 90° C.)/(Content of extractables at 23° C.)     [Equation 1]

(5) The water-absorbing resin according to the above (4), wherein the water-absorbing resin is an acrylic polymer.

(6) The water-absorbing resin according to the above (4), wherein the water-absorbing resin is polymerized by including an internal cross-linking agent.

(7) The water-absorbing resin according to the above (4), wherein the absorbency under unload ranges from 25 g/g to 45 g/g.

(8) The water-absorbing resin according to the above (4), wherein the absorbency under load ranges from 20 g/g to 40 g/g.

(9) The water-absorbing resin according to the above (4), wherein the increase in extractables at a high temperature represented by the above Equation 1 ranges from 1 to 2.8.

(10) The water-absorbing resin according to the above (4), wherein the increase in extractables at a high temperature represented by the above Equation 1 ranges from 1 to 2.5.

(11) The water-absorbing resin according to the above (4), wherein the increase in extractables at a high temperature represented by the above Equation 1 ranges from 1 to 2.

(12) The water-absorbing resin according to the above (4), high-temperature swollen liquid permeability of the water-absorbing resin is 5.0 Darcy or more.

The water-absorbing resin prepared according to the preparation method of the present invention may have improved absorption rate and dry efficiency.

In addition, the water-absorbing resin prepared according to the preparation method of the present invention may exhibit controlled gel-blocking acceleration at a high temperature.

BRIEF DESCRIPTION OF THE DRAWINGS

The above and other objects, features and other advantages of the present invention will be more clearly understood from the following detailed description taken in conjunction with the accompanying drawing, in which:

The FIGURE is a view schematically illustrating the configuration of an apparatus for measuring absorbency under pressure.

DETAILED DESCRIPTION

Hereinafter, the present invention would be described in details.

<Preparation of Water-Absorbing Resin>

Hereinafter, embodiments of the preparation method of the present invention as well as the above description are only proposed to more concretely understand the technical spirit of the present invention, therefore, it is not construed that the present invention is particularly limited to the contents described in the following embodiments.

According to one embodiment of the present invention, there is provided a method of preparing a water-absorbing resin, including polymerization of a composition including an acrylic monomer, a polymerization initiator and an internal cross-linking agent represented by Formula 1.

Through polymerization of a polymer composition prepared by mixing an acrylic monomer, a polymerization initiator and an internal cross-linking agent, a base resin may be prepared.

In the present disclosure, the acrylic monomer refers to acrylic acid or a salt thereof. Acrylic acid salts may include, for example, alkali-metal salt, ammonium salt, alkylamine salt, etc., but it is not limited thereto.

When the acrylic monomer is polymerized to obtain the base resin according to one embodiment of the present invention, a content of acrylic monomer is not particularly limited but, for example, the acrylic monomer may be included and polymerized in an amount of 70 to 100 mol. %, and particularly, 90 to 100 mol. % to a total monomer.

An acid group containing unsaturated monomer such as acrylic monomer may be used after neutralization to have a pH value around a neutral level in aspects of physical properties and pH. For example, the monomer may be neutralized using an alkaline compound such as sodium hydroxide, potassium hydroxide, lithium hydroxide, ammonium carbonate, sodium carbonate, potassium carbonate, ammonium phosphate, sodium phosphate, etc. A rate of neutralization of acid groups (mol. % of neutralized acid groups among total acid groups) generally ranges from 20 to 100 mol. %, for example, 30 to 95 mol. %, and more particularly, 40 to 80 mol. %. If the rate of neutralization is less than 20 mol. %, absorption ability of the resin may be deteriorated. If the rate of neutralization exceeds 80 mol. %, most of the resin may be dissolved in water.

When the monomer is polymerized to obtain the base resin according to one embodiment of the present invention, the polymerization initiator used herein may include, for example, a photo-polymerization initiator such as potassium persulfate, ammonium persulfate, sodium persulfate, potassium peracetate, sodium peracetate, potassium percarbonate, sodium percarbonate, t-butyl hydroperoxide, hydrogen peroxide, 2,2'-azobis(2-amidino-propane)dihydrochloride, 2,2-dimethoxy-1,2-diphenylethan-1-on and 2-hydroxy-2-methyl-1-phenyl-propan-1-on. These compounds may be used alone or in combination of two or more thereof.

An amount of the polymerization initiator is not particularly limited but, for example, may range from 0.001 to 2 parts by weight ('wt. parts'), and particularly, 0.01 to 0.1 wt. parts to a total monomer. If the amount of the polymerization initiator is less than 0.001 wt. parts, unreacted monomer residue may be increased. If the amount exceeds 2 wt. parts, the polymerization may be difficult to control.

According to one embodiment of one embodiment of the present invention, in order to synthesize the base resin, an internal cross-linking agent represented by Formula 1 below may be used.

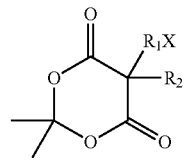

[Formula 1]

wherein $R_1$ is an alkylene group having 1 to 20 carbon atoms, an arylene group having 6 to 12 carbon atoms or a combination of alkylene group and arylene group having a total 7 to 20 carbon atoms, $R_2$ is hydrogen, an alkyl group having 1 to 20 carbon atoms, an aryl group having 6 to 12 carbon atoms, or an alkyl group having 1 to 20 alkyl groups substituted with an aryl group having 6 to 12 carbon atoms, and X is a vinyl group.

More particularly, 5-benzyl-2,2-dimethyl-5-(4-vinylbenzyl)-[1,3]dioxane-4,6-dione is exemplified.

The internal cross-linking agent represented by the above Formula 1 may occur pyrolysis at a temperature of 95° C. or more to generate ketene, which derives additional cross-linking reaction during drying. Therefore, during polymerization of the base resin, the cross-linking agent has higher reactivity than that of the acrylic monomer. As a result, the cross-linking agent is completely exhausted at the early stage of the reaction while the acrylic monomer only comes under polymerization at the later stage of the reaction, and thereby preventing a problem of increasing extractables.

Further, the internal cross-linking agent represented by the above Formula 1 generates acetone and carbon dioxide during pyrolysis, and these may play a role of a foaming agent, thus not requiring addition of any additional foaming agent. Further, since foaming occurs after first polymerization, there is no need for an alternative process or additive to control a foaming time or a particle diameter of foams, therefore, production costs may be reduced, the process may be simplified, and absorption rate and dry efficiency of the water-absorbing resin may be enhanced.

More particularly, a mechanism to achieve effects of one embodiment of the present invention through pyrolysis of one among the internal cross-linking agents represented by the above Formula 1, that is, 5-benzyl-2,2-dimethyl-5-(4-vinylbenzyl)-[1,3]dioxane-4,6-dione, will be described as follows.

[Reaction Scheme 1]

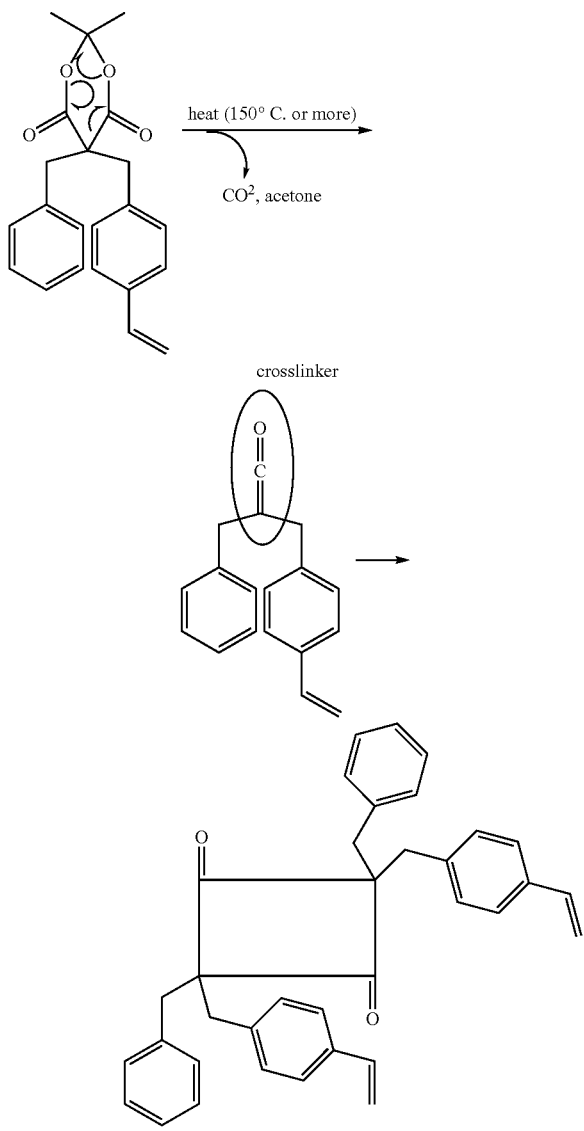

As shown in the above Reaction Scheme 1, 5-benzyl-2,2-dimethyl-5-(4-vinylbenzyl)-[1,3]dioxane-4,6-dione may be used as a comonomer of the base resin according to one embodiment of the present invention, and a specific structure in molecule of a product after pyrolysis may function as a cross-linker.

An amount of the internal cross-linking agent according to one embodiment of the present invention is not particularly limited but, for example, may range from 0.001 to 2 wt. parts, and particularly, 0.005 to 0.5 wt. parts, to 100 wt. parts of the monomer included and polymerized in the polymer. If the content of the internal cross-linking agent is less than 0.001 wt. parts or exceeds 2 wt. parts, it may be difficult to obtain sufficient absorption property.

When using the internal cross-linking agent to form a cross-linkage structure in the polymer, the internal cross-linking agent may be added to a reaction system before, during or after polymerization of unsaturated monomer, or after neutralization of the unsaturated monomer.

The polymerization may be initiated by the above-described polymerization initiator. The polymerization initiator may be used in the range of content as described above.

According to one embodiment of the present invention, a chain transfer agent may be used in the polymerization. When using the water-absorbing resin obtained through the polymerization under the chain transfer agent, an absorbent having a high absorption ability and excellent stability to urine may be obtained. When the chain transfer agent is also used, an amount of the internal cross-linking agent may be increased and, as a result, a cross-linkage density may be increased to thus improve deterioration-resistance to urine.

The chain transfer agent used for polymerization in one embodiment of the present invention is not particularly limited so long as it may be dissolved in water or aqueous ethylene unsaturated monomer and, more particularly, may include, for example, thiols, thiolates, secondary alcohol, amine, phosphorous acid (or phosphite), hypophosphorous acid (or hypophosphite), or the like. In particular, mercaptoethanol, mercaptopropanol, dodecylmercaptan, thioglycols, thiomalic acid, 3-meracaptopropionic acid, isopropanol, sodium phosphite, potassium phosphite, sodium hypophosphite, formic acid or salts thereof, may be exemplified. These compounds may be used alone or in combination of two or more thereof. In an aspect of effects, phosphorous compounds, especially, hypophosphite such as sodium hypophosphite may be used.

An amount of the chain transfer agent is not particularly limited and, for example, may range from 0.001 to 1 mol. %, and particularly, 0.005 to 0.3 mol. % among the total monomer used for formation of an acrylic acid polymer. If the amount is less than 0.001 mol %, improvement effects using the chain transfer agent may be insignificant. If the amount exceeds 1 mol. %, the extractables may be increased while stability may be reduced.

The chain transfer agent may be added before or during polymerization, in sequential order.

As necessary, the method of preparing a water-absorbing resin according to one embodiment of the present invention may further include neutralization of the acrylic monomer.

The neutralization may be conducted by adding alkali in order to obtain a neutralization rate of acid groups (mol. % of neutralized acid groups among the total acid groups) in a range of, for example, 20 to 100 mol. %, particularly, 30 to 95 mol. %, and more particularly, 40 to 80 mol. %. If the rate of neutralization is less than 20 mol. %, absorption ability of the resin may be deteriorated, and if it exceeds 80 mol. %, the resin may be mostly dissolved in water.

The neutralization may be conducted before the cross-linking polymerization step, during the cross-linking polymerization step, after the cross-linking polymerization step, or through multiple steps.

As necessary, any typical process known in the related art may be further included to prepare the water-absorbing resin.

For example, one embodiment of the present invention may further include: segmentation of the base resin obtained by the cross-linking polymerization; drying and grinding the segmented base resin to provide a granular base resin; and surface cross-linking the granular base resin.

For segmentation of the base resin, one embodiment of the present invention may use a grinder such as shear granulation machines, impact crushers, high-speed rotation crushers, etc., but it is not limited thereto.

The grinder provided with at least one grinding device among cutting, shearing, impact and friction devices may be used. In particular, the grinder having the cutting or shearing device as a main function is more preferably used. Further, a grinder provided with a compressor may be used in applications that are expected to involve strong shearing and cutting effects. Among other grinders listed above, it is particularly preferable to use a machine having multiple rotating blades and fixed blades to secure a shearing force, thus achieving desired grinding effects.

Segmentation of the base resin may be performed to reach an average particle diameter of 1 to 20 mm.

A rotational velocity of the rotating blade, for example, ranges from 3.0 to 200 m/sec, and more particularly, 5.0 to 150 m/sec.

The segmented base resin may undergo drying, for example, at a temperature of 50 to 250° C., and particularly, 100 to 170° C. If the drying temperature is less than 50° C., such lack of temperature may extend a time required for drying, hence reducing productivity.

The drying process may include any of drying methods to obtain desired water content, for example, heat drying, hot air drying, vacuum drying, infrared ray drying, microwave drying, dehydration using azeotrope with a hydrophobic organic solvent, high humidity drying using hot vapor, etc., but it is not limited thereto.

The segmented base resin may be ground by the same segmentation method as illustrated above.

The base resin may be ground to have an average particle diameter of, for example, 150 to 850 μm, particularly, 150 to 600 μm, and more particularly, 180 to 500 μm. A rate of particles having a particle diameter of less than 150 μm may range from 0 to 8 wt. %, and for example, 0 to 5 wt. % to a total weight of the granular base resin.

Thereafter, the surface of the granular base resin may be subjected to cross-linking.

According to one embodiment of the present invention, surface cross-linking means that a cross-linking density near the surface of a particle is more increased than the inside of the particle. More particularly, the surface cross-linking refers to an operation to form a new cross-linkage bond by adding a compound (surface cross-linking agent) containing at least two functional groups, which can react with an acid group or a salt thereof (for example, a carboxyl group or a salt thereof) in the granular base resin, to the surface of the particle. By performing the surface cross-linking process, absorption ability under pressure may be improved.

The surface cross-linking agent used herein may be the above-mentioned surface cross-linking agent in a range of content to be described below.

The surface cross-linking process may be conducted at a temperature of, for example, 150 to 250° C. for 1 minute to 4 hours.

The surface cross-linking agent useable in one embodiment of the present invention is not particularly limited but may include any surface cross-linking agent known in the related art, for example, (i) polyalcohol compounds such as 1,3-propanediol, 1-methyl-1,3-propanediol, 2-methyl-1,3-propanediol, ethylene glycol, diethyleneglycol, triethylene glycol, tetraethylene glycol, polyethyleneglycol, propylene glycol, dipropylene glycol, polypropylene glycol, 2,3,4-trimethyl-1,3-pentanediol, glycerin, polyglycerin, 2-butene-1,4-diol, 1,4-butanediol, 1,3-butanediol, 1,5-pentanediol, 1,6-hexanediol, meso-erythritol, D-sorbitol, 1,2-cyclohexanedimethanol, hexanediol trimethylolpropane, pentaerythritol, etc.; (ii) epoxy compounds such as ethylene glycol diglycidyl ether, polyethyleneglycol diglycidyl ether, glycerol polyglycidyl ether, propylene glycol diglycidyl ether, polypropylene glycol diglycidyl ether, etc.; (iii) polymetal compounds such as hydroxides or chlorides of calcium, magnesium, aluminum, iron, etc.; (iv) oxazolidinone compounds such as N-acyl oxazolidinone compound, 2-oxazolidinone compound, etc. (U.S. Pat. No. 6,559,239); (v) alkylene carbonate compound such as 1,3-dioxolan-2-on (sometimes referred to as "ethylene carbonate"), 4-methyl-1,3-dioxolan-2-on, 4,5-dimethyl-1,3-dioxolan-2-on, 4,4-dimethyl-1,3-dioxolan-2-on, 4-ethyl-1,3-dioxolan-2-on, 4-hydroxymethyl-1,3-dioxolan-2-on, 1,3-dioxan-2-on, 4-methyl-1,3-dioxan-2-on, 4,6-dimethyl-1,3-dioxan-2-on, 1,3-dioxespan-2-on, etc. (U.S. Pat. No. 5,409,771); (vi) oxetane compound (3-ethyl-3-hydroxymethyl oxetane) and cyclic urea compound (2-imidazolidinone) (U.S. Patent Publication No. 2002/0072471); (vii) aminoalcohol compound such as ethanolamine, diethanolamine, etc. These compounds may be used alone or in combination of two or more thereof.

An amount of the surface cross-linking agent used herein is not particularly limited but, for example, may range from 0.001 to 10 wt. parts, and particularly, 0.01 to 5 wt. parts to 100 wt. parts of the granular base resin. When the surface cross-linking agent is used in the above content, the absorbency under load may be achieved.

<Water-Absorbing Resin>

The absorbency under non-pressure (that is, 'under unload') described in the present disclosure is an abbreviation of "centrifuge retention capacity (CRC)" and may indicate absorbency (g/g) obtained by swelling 0.2 g of a water-absorbing resin contained in a non-woven fabric bag, tea-bag, etc. in 0.9 wt. % of saline for 30 minutes, followed by removal of water through a centrifuge. This absorbency under unload may be determined by Equation 2 below.

Absorbency under unload$(g/g)$={(Weight of water-absorbing resin+Tea-bag$(g)$)−(Weight of empty tea-bag$(g)$)}/Weight of dried resin$(g)$     [Equation 2]

The absorbency under load (AUL) means the absorbency (g/g) obtained after swelling the water-absorbing resin under pressure (that is, load). In the present disclosure, the absorbency under 0.3 psi load to saline refers to the absorbency (g/g) obtained after swelling the water-absorbing resin in 0.9 wt. % saline for 60 minutes under 0.3 psi pressure (load), and may be determined by Equation 3 below.

Absorbency under load$(g/g)$=(Weight of absorbent polymer after absorption$(w1)$−Weight of absorbent polymer before absorption$(w0)$)/Weight of absorbent polymer before absorption$(w0)$.     [Equation 3]

In the present disclosure, extractables refer to an acryl oligomer component (liquid eluent) dissolved in water, and may be determined according to Equation 4 below by immersing an water-absorbing resin in water with 100 times the weight of the resin for 1 hour, filtering the prepared water-soluble solution through a filter under pressure, dehumidifying and drying the extracted component.

Extractables(wt. %)=(Weight of extracted component/Weight of initial dried water-absorbing resin)×100     [Equation 4]

In the present disclosure, the water-absorbing resin refers to a water-swelling and water-insoluble polymer. Also, the water-swelling polymer means a polymer having the absorbency under unload (CRC) of 5 g/g or more, which is defined according to ERT 442.2-02, while the water-insoluble polymer means a polymer containing 0 to 50 wt. % of extractables, which is defined according to ERT 470.2-02.

In the present disclosure, a high-temperature swollen liquid permeability refers to a flow rate obtained by free swelling 1 g of a super-absorbent polymer in 0.9% NaCl solution at 40° C. for 60 minutes, placing 0.3 psi weight thereon, passing 300 ml of 0.9% NaCl solution by 10 ml per time through the super-absorbent polymer, measuring a height of a gel bed and a permeation time of 10 ml, and applying a permeation gradient (g/sec) calculated from these measured gel bed height and permeation time to Darcy's equation. Except for a temperature during free-swelling, the same gel phase permeation test procedures as disclosed in Korean Patent Registration No. 0873455 may be conducted. The absorbency under unload of the water-absorbing resin according to one embodiment of the present invention may be 25 g/g or more, while the absorbency under load may be 20 g/g or more, and an increase in extractables at a high temperature represented by Equation 1 below may range from 1 or more but less than 3:

Increase in extractables at high temperature=Content of extractables at 90° C./Content of extractables at 23° C.     [Equation 1]

The water-absorbing resin of one embodiment of the present invention may satisfy all of the absorbency under unload, the absorbency under load and the increase in extractables at a high temperature in the above ranges thereof, thereby enhancing desired absorption rate and dry efficiency.

The absorbency under unload according to one embodiment of the present invention should be 25 g/g or more. If the absorbency under unload is less than 25 g/g, absorption property is reduced to cause a problem of not properly utilizing the resin as a raw material for hygienic products. An upper limit of the absorbency under unload is not particularly limited, however, may range from 25 g/g to 45 g/g. Within the above range, absorption property and a gel intensity are superior to prevent an occurrence of gel-block.

The water-absorbing resin according to one embodiment of the present invention should have absorbency under 0.3 psi load of 20 g/g or more and, in this case, leakage of absorbed liquid may be minimized. If the absorbency under 0.3 psi load is less than 20 g/g, the absorption property under a condition with load, at which a diaper is actually used, is deteriorated, hence causing a problem of not properly utilizing the resin as a raw material for hygienic products. The upper limit of the absorbency under load is not particularly limited, however, in an aspect of balance with other physical properties, may range from 20 g/g to 40 g/g, more particularly, 30 g/g to 40 g/g. Within the above range, absorption becomes excellent, and oil absorption ability and other physical properties may also be retained in an aspect of physical property balance.

The absorbency under load within the above range may be obtained by regulating a degree of surface cross-linkage or the like, however, it is not particularly limited thereto.

An increase in extractables at a high temperature according to one embodiment of the present invention may be represented by the above Equation 1.

The cross-linkage structure of an ideal super-absorbent polymer is that molecular weights between cross-linking points are constant and all molecules participate in the cross-linkage structure. In this regard, according to the conventional preparation method, the cross-linking agent is exhausted at the initial stage of the reaction and the cross-linkage structure is concentrated in only a part of the super-absorbent polymer, hence causing a problem of irregularity. The super-absorbent polymer with unequal distribution of the cross-linkage structure does not exhibit a considerable reduction in physical properties such as a liquid permeability at room temperature. However, since there are relatively many molecules having a loose cross-linkage structure, this may cause the extractables to increase under a temperature condition at which body temperature generates heat and protects the heat. As such, If the content of the extractables is more increased at a high temperature, adhesion between gel particles increases and causes a problem of accelerating a gel-blocking phenomenon that inhibits liquid permeation.

Accordingly, one embodiment of the present invention has introduced a novel parameter referred to an 'increase in extractables at a high temperature,' therefore, the super-absorbent polymer of one embodiment of the present invention can prevent the gel-blocking phenomenon even at a high temperature, while not deteriorating other physical properties such as free absorption ability, when the increase in extractables at a high temperature is within a specific range.

A lower limit of the increase in extractables at a high temperature may be defined as 1.0 when the content of the extractables at a low temperature and a high temperature are the same as each other. As the lower limit is closer to 1.0, the water-absorbing resin may have a higher cross-linkage density and cross-linking points are more regularly connected to show a uniform distribution thereof. These results mean that the extractables at the high temperature are reduced, therefore, the gel-blocking phenomenon is minimized while retaining excellent absorption property.

The increase in extractables at a high temperature according to one embodiment of the present invention should be 1 or more but less than 3. The content of the extractables at a high temperature is generally increased. Therefore, according to the above definition for the increase in extractables at a high temperature, the lower limit of the increase in extractables at a high temperature may become 1.0. Meanwhile, if the increase in extractables at a high temperature is 3 or more, generation of the extractables in the resin may be accelerated under a condition of increasing the temperature. Therefore, when the super-absorbent polymer absorbs water and is swollen, the extractables are dissolved from inside of the swollen gel to increase adhesion between gel particles, hence accelerating the gel-blocking phenomenon that inhibits liquid permeation. Within the above range, the gel-blocking phenomenon may be prevented without deteriorating other physical properties. The upper limit is not particularly limited but may be 2.8 or less, for example, 2.5 or less, and more particularly, 2 or less. As the upper limit is closer to 1.0, the water-absorbing resin has a higher cross-linking density and cross-linking points are more regularly connected to show a uniform distribution thereof. These results mean that the extractables at the high temperature are decreased, therefore, the gel-blocking phenomenon is minimized while retaining excellent absorption property.

When measuring the content of extractables, the content is not particularly limited so long as it is a value of monomer residues measured at 90° C. and 23° C., respectively. However, for example, the content of extractables at 90° C. may range from 2 to 50 wt. % while the content of extractables at 23° C. may range from 2 to 15 wt. %.

The water-absorbing resin according to one embodiment of the present invention may have a high-temperature swollen liquid permeability of 5.0 Darcy or more. Within the above range, adhesion between gel particles may be controlled so as not to increase, thereby preventing a reduction in liquid permeability and, as a result, preventing a gel-blocking phenomenon.

It is preferable that the high-temperature swollen liquid permeability is increased, therefore, an upper limit thereof is not particularly limited but, for example, may be 60 Darcy without particular limitation thereof.

The water-absorbing resin according to one embodiment of the present invention may be prepared by a variety of methods including the above preparation method.

For example, the water-absorbing resin of one embodiment of the present invention may be prepared by: controlling a water retention rate of the water-absorbing resin, specified types and/or contents of monomers used, or the like; controlling types or content of an internal cross-linking agent used in the polymerization of the water-absorbing resin; or adjusting a content of solvent or regulating conditions for a surface cross-linking process, or the like.

In one embodiment of the present invention, the water-absorbing resin may be prepared by grinding a base resin, and then, surface cross-linking the same.

The base resin may include, for example, one or two or more selected from a group consisting of: acrylic polymer; hydrolysate of starch-acrylonitrile graft polymer; starch-acrylic acid graft polymer or a neutralization product thereof; a carboxymethyl cellulose cross-linked product; a saponification product of vinyl acetate-acrylic acid ester copolymer; acrylonitrile copolymer, or hydrolysate of acrylamide copolymer or a cross-linked product thereof; carboxyl group containing cross-linked polyvinyl alcohol modified product; a cross-linked product of cationic monomer; a cross-linked product of 2-acrylamide-2-methylpropane sulfonic acid and acrylic acid; cross-linked isobutylene-maleic anhydride copolymer; or the like. Among these, acrylic polymer may be used.

Hereinafter, acrylic polymer used as a base resin will be described in detail, but it is not limited thereto.

The acrylic polymer may be a homopolymer or copolymer of acrylic monomers. In the present disclosure, the acrylic monomer is the same as described above.

According to one embodiment of the present invention, the acrylic copolymer may be polymerized while further including any unsaturated monomer known in the related art other than the above-described acrylic monomer.

For example, acid group containing monomers such as β-acryloyloxy propionic acid, methacrylic acid, maleic anhydride, fumaric acid, crotonic acid, itaconic acid, vinyl sulfonic acid, 2-(meth)acrylamide-2-methylpropane sulfonic acid, (meth)acryloxyalkane sulfonic acid, etc., and alkali-metal salts, aluminum salts, and alkylamine salts thereof; water-soluble or water-insoluble unsaturated monomers such as N-vinyl-2-pyrrolidone, N-vinyl acetamide, (meth)acrylamide, N-isopropyl(meth)acrylamide, N,N-dimethyl(meth)acrylamide, 2-hydroxyethyl(meth)acrylate, methoxypolyethylene glycol(meth)acrylate, polyethyleneglycol(meth)acrylate, isobutylene, lauryl(meth)acrylate, etc.; or the like, may be exemplified. These compounds may be used alone or in combination of two or more thereof.

Typical acrylic copolymer may include polymerized and cross-linked polymers including the above-described acrylic monomer.

According to one embodiment of the present invention, the cross-linkage structure may be formed in a self cross-linkage form without using an alternative cross-linkable monomer. According to another embodiment, the cross-linkage structure may be formed in a cross-linkage form using an internal cross-linking agent such as a cross-linkable monomer.

The cross-linkable monomer may have at least two polymerizable unsaturated functional groups, or at least two reactive functional groups.

The internal cross-linking agent may include, for example, N,N'-methylene bis(meth)acrylamide, (poly)ethylene glycol di(meth)acrylate, (poly)propylene glycol di(meth)acrylate, trimethyolpropane tri(meth)acrylate, glycerin tri(meth)acrylate, glycerol acrylate methacrylate, ethyleneoxide modified trimethylolpropane tri(meth)acrylate, pentaerythritol hexa(meth)acrylate, triallyl cyanurate, triallyl isocyanurate, triallyl phosphate, triallylamine, poly(meth)allyloxyalcane, (poly)ethylene glycol diglycidyl ether, glycerol diglycidyl ether, ethylene glycol, polyethyleneglycol, propylene glycol, glycerin, pentaerythritol, ethylenediamine, ethylene carbonate, propylene carbonate, polyethylenimine, glycidyl(meth)acylate, or the like. For example, Meldrum's acid derivatives are used. In particular, Meldrum's acid derivatives represented by the above Formula 1 may be used. More particularly, 5-benzyl-2,2-dimethyl-5-(4-vinylbenzyl)-[1,3]dioxane-4,6-dione is exemplified. These compounds may be used alone or in combination of two or more thereof.

Hereinafter, preferred embodiments are proposed to more concretely explain the present invention. However, the following examples are only given for illustrating the present invention and those skilled in the related art will obviously understand that various alterations and modifications are possible within the scope and spirit of the present invention. Such alterations and modifications are duly included in the appended claims.

Examples and Comparative Examples

A polymerization initiator and an internal cross-linking agent were added to a water-soluble solution containing each of the acrylic monomers with constitutional compositions as listed in Table 1, and then the prepared solution was cooled at 10° C.

Thereafter, an amount of dissolved oxygen was set up to 1 ppm or less through nitrogen suction, and 300 g of this solution was added to a schale (petri dish) having an inner diameter of 146 mm and a height of 25 mm to reach a thickness of 18 mm. Thereafter, using a UV-ray curing device (with a high pressure mercury lamp 4 KW, 80 W/cm, and a light emitter 250 nm), UV radiation (with radiation intensity of 750 m Joule/cm$^2$) was conducted for 30 seconds to prepare a hydrogel phase polymer.

After adding a surface cross-linking agent to the obtained hydrogel phase polymer, the mixture was cut into pieces having a length of 3 mm, dried by a hot air dryer at 135° C. for 60 minutes, and ground by a roll-mill grinder to obtain a water-absorbing resin having a particle diameter in a range of 300 μm to 500 μm.

The absorbency under load, absorbency under unload, content of extractable, absorption rate, dry efficiency and high temperature swollen liquid permeability were measured.

TABLE 1

| Section | Acrylic monomer solution (A) | | Internal cross-linking agent (B) | | Polymerization initiator (C) | | Surface cross-linking agent (D) Wt. part to 100 wt. parts of granular base resin |
|---|---|---|---|---|---|---|---|
| | Concentration of monomer Wt. % | Acrylic acid/Sodium acrylate Mol. % | Component | Wt. parts to 100 wt. parts of the monomer | Component | Wt. parts to 100 wt. parts of the monomer | |
| Example 1 | 40 | 25/75 | B-1 | 0.05 | C-1 | 0.005 | 0.5/1/3 |
| | | | | | C-2 | 0.02 | |
| Example 2 | 40 | 25/75 | B-1 | 0.01 | C-1 | 0.005 | 0.5/1/3 |
| | | | | | C-2 | 0.02 | |
| Example 3 | 40 | 25/75 | B-1 | 0.1 | C-1 | 0.005 | 0.5/1/3 |
| | | | | | C-2 | 0.02 | |
| Comparative Example 1 | 40 | 25/75 | B-2 | 0.05 | C-1 | 0.005 | 0.5/1/3 |
| | | | | | C-2 | 0.02 | |
| Comparative Example 2 | 40 | 25/75 | B-3 | 0.05 | C-1 | 0.005 | 0.5/1/3 |
| | | | | | C-2 | 0.02 | |

B-1: 5-benzyl-2,2-dimethyl-5-(4-vinylbenzyl)-[1,3]dioxane-4,6-dione
B-2: trimethylolpropane triacrylate
B-3: methylene bisacrylamide
C-1: 2,2-dimethoxy-1,2-diphenylethan-1-on
C-2: sodium persulfate
D: 1,3-propanediol/methanol/water Experimental Example (1) Measurement of Absorbency Under Load (AUL)

The absorbency under load was determined using an apparatus shown in the FIGURE. The apparatus for measurement consists of: A1: weight (0.3 psi), A2: cylinder, A4: non-woven fabric, A5: paper filter, A6: glass filter, A7: glass filter support, A9: cylinder support, A10: container, A11: connection line, A12: reservoir, and installation and measurement of the absorbency under load are conducted as follows.

The cylinder support A9 and the reservoir A12 were connected by the connection line A11, and each of the devices had a hole through which 0.9% saline A13 contained in the reservoir can pass and move. After placing the cylinder support A9 on the container A10, the top of the glass filter A6 was matched with the top of the cylinder support A9 in the same height using the glass filter support A7. Thereafter, the paper filter A5 having a larger size than the top of the cylinder support A9 was positioned on the same. By opening a plug of the reservoir A12 to flow the saline A13, the saline A13 passing through the connection line was fully filled in the top of the cylinder support A9 and the excess of saline was naturally discarded into an external container through the paper filter A5. Air bubbles were removed if these bubbles are formed between the glass filter A6 and the paper filter A5.

After evenly spreading 0.9 g (w0) on a non-woven fabric A3 above the cylinder A2 covered with non-woven fabric A4 at the bottom thereof, the cylinder was placed on the paper filter and the weight A1 was quickly provided thereon.

After 1 hour, the hydrogel in the cylinder was recovered, followed by measuring the weight of the hydrogel (w1, weight of the absorbent polymer after absorption). Then, according to the above Equation 3, the absorbency under load was calculated. Results thereof are shown in Table 2 below.

(2) Determination of Absorbency Under Unload (CRC) (EDANA WSP 241.2R3)

After sealing 0.2 g of the water-absorbing resin prepared in each of the examples and comparative examples in a teabag, it was dipped in 0.9 wt. % saline for absorption over 30 minutes.

Then, after centrifuging the teabag in a centrifuge set up at 250 G for 3 minutes, a weight of the teabag was measured.

An empty teabag was also subjected to the same procedure as described above to measure a weight thereof, and the absorbency under unload was calculated by the above Equation 2. Results thereof are shown in Table 2.

(3) Measurement of Extractables (EDANA WSP 270.2.R3)

The extractables in the water-absorbing resin were measured according to extraction under pressure.

After dehumidifying and drying the water-absorbing resin prepared in each of the examples and comparative examples at 80° C. for 3 hours, 2 g of the dried resin and 200 g of water were placed in a planetary mixer (Unitec Co. Ltd.), then agitated at 50 rpm for 1 hour.

After pouring the prepared solution in a container provided with 1.2 μm glass filter paper, the solution having passed through the filter using a nitrogen gas at 35° C. under 5 psi was slowly concentrated, followed by dehumidifying and drying the extract. From the treated extract, the extractables were measured by the above Equation 4.

According to the above procedures, a content of the extractables was measured at 90° C. and 23° C., respectively, followed by calculating an increase in the extractables by the above Equation 1. Results thereof are shown in Table 2.

(4) Measurement of Absorption Rate

In 100 ml glass beaker, 50 g of saline and a Teflon-coated octagonal magnetic bar with a size of 8 mm×30 mm was placed and agitated at a speed of 600 rpm on a magnetic stirrer. After finding that a stable vortex occurred in the solution, 2.0 g of the water-absorbing resin was added to the solution at once. A time required until the vortex disappears and the surface of liquid becomes smooth, was measured. Results thereof are shown in Table 2 below.

(5) Determination of Dry Efficiency

After grinding the hydrogel prepared in each of the examples and comparative examples, 10 g of gel particles with a size of 5 mm to 6 mm was taken and placed on an IR-Balance. Such a sample placed on the balance was heated from 23° C. to 150° C. through an IR heater, followed by measuring an amount of evaporation while keeping the same temperature. An amount of water from a heating completed time at 150° C. to a time required to dry the sample for 5 minutes was measured to determine the dry efficiency thereof. Results thereof are shown in Table 2 below.

(6) Measurement of High Temperature Swollen Liquid Permeability

With regard to the super-absorbent polymer prepared in each of the examples and comparative examples, a high-temperature swollen liquid permeability was measured and results thereof are shown in Table 2 below.

TABLE 2

| Secton | Absorbency under load (g/g) | Absorbency under unload (g/g) | Content of extractables at 90° C. (wt %) | Content of extractables at 23° C. (wt %) | Increase in extractables at high temperature | Absorption rate (sec) | Dry efficiency (g/ 5 min) | High-temperature swollen liquid permeability (Darcy) |
|---|---|---|---|---|---|---|---|---|
| Example 1 | 35 | 40 | 9.43 | 4.1 | 2.3 | 40 | 4.2 | 15.9 |
| Example 2 | 37 | 42 | 14.84 | 5.3 | 2.8 | 45 | 4 | 7.0 |
| Example 3 | 31 | 35 | 4.16 | 2.6 | 1.6 | 32 | 4.5 | 23.9 |
| Comparative Example 1 | 25 | 29 | 21.7 | 6.2 | 3.5 | 110 | 3.1 | 4.2 |
| Comparative Example 2 | 22 | 31 | 35.88 | 7.8 | 4.6 | 103 | 3.3 | 1.0 |

As shown in Table 2, it could be understood that the examples show an increase in the extractables at a high temperature in a range of 1 or more but less than 3, while the comparative examples have the same of exceeding 3, which is out of the range in the present invention.

Further, as compared to the comparative examples, the examples have a small content of extractables not only at room temperature but also at a high temperature, because of the constitutional compositions to inhibit generation of the extractables. Also, since an internal cross-linking agent is used according to the present invention, a surface area is increased due to a foaming structure, and thereby increasing the absorption rate. In addition, it could also be seen that the high absorbency under unload is high, and the high temperature swollen liquid permeability is at least 5 Darcy.

Furthermore, as compared to the comparative examples, the examples show a larger amount of water to be dried for 5 minutes. Therefore, it could be seen that the dry efficiency becomes higher within the range defined by the present invention.

What is claimed is:

1. A water-absorbing resin, having an absorbency under unload of 25 g/g or more, an absorbency under load of 20 g/g or more, and an increase in extractables at a high temperature in a range of 1 or more but less than 3, which is represented by Equation 1 below:

Increase in extractables at a high temperature=(Content of extractables at 90° C.)/(Content of extractables at 23° C.)  [Equation 1].

2. The water-absorbing resin according to claim 1, wherein the water-absorbing resin is an acrylic polymer.

3. The water-absorbing resin according to claim 1, wherein the water-absorbing resin is polymerized by including an internal cross-linking agent.

4. The water-absorbing resin according to claim 1, wherein the absorbency under unload ranges from 25 g/g to 45 g/g.

5. The water-absorbing resin according to claim 1, wherein the absorbency under load ranges from 20 g/g to 40 g/g.

6. The water-absorbing resin according to the claim 1, wherein the increase in extractables at a high temperature represented by the above Equation 1 ranges from 1 to 2.8.

7. The water-absorbing resin according to the claim 1, wherein the increase in extractables at a high temperature represented by the above Equation 1 ranges from 1 to 2.5.

8. The water-absorbing resin according to claim 1, wherein the increase in extractables at a high temperature represented by the above Equation 1 ranges from 1 to 2.

9. The water-absorbing resin according to the claim 1, high-temperature swollen liquid permeability of the water-absorbing resin is 5.0 Darcy or more.

10. The water-absorbing resin according to the claim 1, wherein the water-absorbing resin is produced by a process comprising:

polymerizing a composition which includes an acrylic monomer, a polymerization initiator and an internal cross-linking agent represented by Formula 1 below:

[Formula 1]

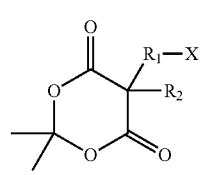

wherein R1 is an alkylene group having 1 to 20 carbon atoms, an arylene group having 6 to 12 carbon atoms or a combination of alkylene group and arylene group having a total 7 to 20 carbon atoms;

R2 is hydrogen, an alkyl group having 1 to 20 carbon atoms, an aryl group having 6 to 12 carbon atoms, or an alkyl group having 1 to 20 alkyl groups substituted with an aryl group having 6 to 12 carbon atoms; and X is a vinyl group.

11. The water-absorbing resin according to the claim 1, wherein the internal cross-linking agent is 5-benzyl-2,2-dimethyl-5-(4-vinylbenzyl)-[1,3]dioxane-4,6-dione.

12. The water-absorbing resin according to the claim 1, wherein the internal cross-linking agent is included in an amount of 0.001 to 2 parts by weight to 100 parts by weight of the monomer.

* * * * *